(12) United States Patent
Barnekow et al.

(10) Patent No.: US 12,089,620 B2
(45) Date of Patent: Sep. 17, 2024

(54) DELIVERY SYSTEM FOR FOOD ADDITIVES AND ITS PREPARATION

(71) Applicant: SYMRISE AG, Holzminden (DE)

(72) Inventors: Sylvia Barnekow, Marienmünster (DE); Jochen Blume, Lüdinghausen (DE)

(73) Assignee: Symrise AG, Holzminden (DE)

(*) Notice: Subject to any disclaimer, the term of this patent is extended or adjusted under 35 U.S.C. 154(b) by 271 days.

(21) Appl. No.: 15/652,457

(22) Filed: Jul. 18, 2017

(65) Prior Publication Data
US 2018/0160710 A1  Jun. 14, 2018

(30) Foreign Application Priority Data
Dec. 14, 2016 (WO) ................ PCT/EP2016/081028

(51) Int. Cl.
| | |
|---|---|
| *A23L 29/10* | (2016.01) |
| *A23C 9/12* | (2006.01) |
| *A23C 9/133* | (2006.01) |
| *A23D 7/00* | (2006.01) |
| *A23D 7/005* | (2006.01) |
| *A23D 7/01* | (2006.01) |
| *A23L 5/40* | (2016.01) |
| *A23L 5/42* | (2016.01) |
| *A23L 19/00* | (2016.01) |

(Continued)

(52) U.S. Cl.
CPC ............... *A23L 29/10* (2016.08); *A23C 9/12* (2013.01); *A23C 9/133* (2013.01); *A23D 7/003* (2013.01); *A23D 7/0053* (2013.01); *A23D 7/011* (2013.01); *A23L 5/40* (2016.08); *A23L 5/42* (2016.08); *A23L 19/09* (2016.08); *A23L 27/00* (2016.08); *A23L 27/80* (2016.08); *A23L 29/00* (2016.08); *A23L 29/231* (2016.08); *A23L 29/238* (2016.08); *A23P 20/20* (2016.08); *A23C 2270/05* (2013.01); *A23V 2002/00* (2013.01)

(58) Field of Classification Search
CPC ................................. A23L 29/10; A23L 27/80
See application file for complete search history.

(56) References Cited

U.S. PATENT DOCUMENTS

| | | | | |
|---|---|---|---|---|
| 1,625,641 A | * | 4/1927 | Douglas | A23D 7/0056 426/602 |
| 5,962,058 A | * | 10/1999 | Ono | A23D 7/011 426/564 |

(Continued)

FOREIGN PATENT DOCUMENTS

| | | | |
|---|---|---|---|
| EP | 5 290 A1 | 11/1979 | |
| EP | 2 687 103 A1 | 1/2014 | |

(Continued)

OTHER PUBLICATIONS

Moreau, Robert A. Kamal-Eldin, Afaf. (2009). Gourmet and Health-Promoting Specialty Oils. AOCS Press. Retrieved from < https://app.knovel.com/hotlink/toc/id:kpGHPSO00R/gourmet-health-promoting/gourmet-health-promoting>. (Year: 2009).*

*Primary Examiner* — Stephanie A Cox
(74) *Attorney, Agent, or Firm* — Dilworth & Barrese, LLP

(57) ABSTRACT

Suggested is a delivery system for food additives, comprising or consisting of the following components:
(a) at least one food additive dissolved in a solvent and
(b) at least one emulsifier and/or at least one hydrocolloid dissolved in water,
characterized in that the delivery system is an oil-in-water emulsion.

13 Claims, 4 Drawing Sheets

(51) Int. Cl.
*A23L 27/00* (2016.01)
*A23L 29/00* (2016.01)
*A23L 29/231* (2016.01)
*A23L 29/238* (2016.01)
*A23P 20/20* (2016.01)

(56) References Cited

U.S. PATENT DOCUMENTS

| | | | | |
|---|---|---|---|---|
| 6,703,062 | B1* | 3/2004 | Appleqvist | A23D 7/0056 |
| | | | | 426/565 |
| 2004/0009285 | A1* | 1/2004 | Antheunisse | A23C 9/154 |
| | | | | 426/601 |
| 2005/0048181 | A1* | 3/2005 | Gelin | A23C 13/12 |
| | | | | 426/534 |
| 2005/0202149 | A1 | 9/2005 | McClements et al. | |
| 2015/0099054 | A1* | 4/2015 | Steinberg | A23L 27/60 |
| | | | | 426/605 |

FOREIGN PATENT DOCUMENTS

| | | |
|---|---|---|
| WO | 2007/060171 A1 | 5/2007 |
| WO | 2008/145183 A1 | 12/2008 |
| WO | 2015/130631 A1 | 9/2015 |

* cited by examiner

DELIVERY SYSTEM FOR FOOD ADDITIVES AND ITS PREPARATION

FIELD OF INVENTION

The present invention belongs to the field of oil soluble food additives, especially food additives providing colour or flavour for multilayer aqueous-based food product, and concerns a food additives delivery system with improved stability and retainability, process for its preparation and a multilayer food product comprising the said food additives system.

STATE OF THE ART

For centuries, food additives have served useful functions in a variety of foods. The broadest practical definition of a food additive is any substance added to food base during either formulation or processing of food products and becomes a component or otherwise affects the characteristics of any food. Generally food additives serve four major purposes in the food products: improving or maintaining the nutritional quality of foods; maintaining product quality and freshness; aiding in the processing and preparation of foods; and making foods appealing.

With the development of food industry the intake of food products is not confined any more to satisfying the biological needs of human by supplying essential nutrients, but extended to catering for the psychological needs. More and more food manufacturers as well as customers pursue food products excellent not only in nutrients composition, but also in color, flavour, taste and texture, which bring the feelings of delicacy, health and nature. As a result food additives, chiefly flavouring agents and enhancers, colouring agents and sweeteners, stabilizers and thickeners are included by food processors for increasing the attraction of the food products and further satisfying the growing demand in the food markets.

In order to realize the best function of food additives but not lead to unwanted change of the physical and chemical properties of the food products, a lot of research has been focused on the selectivity of appropriate food additives for arriving the best compatibility with the food base, which, however, due to the complex composition and form of the products, cannot always reach the expected aim. This problem is particularly evident with the recently popular multilayer food products.

Multilayer food products concern products comprising at least one lower layer and one upper layer (or surface layer). The food bases in different layers generally possess distinguished composition and texture from each other, which ensures a stable layering during processing and storage. However it is unavoidable that the food additives contained in one layer migrate into an adjacent layer, which results in unwanted modification in colour, taste and even texture of the adjacent layer during the shelf life of the multilayer food products. The typical examples are multilayer yogurt and pudding products and non-milk gel-based dessert products.

Until now the majority of studies have been concentrated on texture/flavour or on matrix/aroma compound interaction in gel-based food products, especially dairy products such as yogurts and puddings and the influence of the composition and texture of the products on delivering aroma in the mouth. Hansson (J. Agric. Food Chem. 2003, 51, 4732) reported that pectin gel-type of a food product has a relatively small influence on aroma delivery. Kora (J. Agric. Food Chem. 2004, 52, 3048) studied the aroma compound retention by the dairy matrix of yogurt with various textures by adding thickening agent or subjecting to mechanical treatment. It is further proved by Sante-Eve (J. Agric. Food Chem. 2006, 54, 3997) that on one hand the physicochemical interaction between aroma compounds and proteins can determine the delivery of flavour in yogurt, and on the other hand the heterogeneous network with large pores of yogurt might constitute an effective barrier for the aroma composition transfer in static condition. Lubbers (J. Agric. Food Chem. 2007, 55, 4835) has specified the effects of different thickeners including starch, pectin and locust bean gum on the delivery of aroma compounds.

It is obvious that all these mentioned researches aim at the retention of food additives contained in the products, particular flavour and aroma additives, as well as their delivery to the mouth. There is however only a few papers relating to the prevention of food additives from migration among the multilayers of aqueous-based gel dairy products.

US 2011/0051199A1 discloses a multi-layered dessert product such as a pudding product made from a gel having a continuous aqueous phase and a dispersed colloidal oil phase. In order to reduce colour migration in this multi-layered pudding at least one of the used colorants being a natural oil soluble colorant. However, it is reported that this natural oil soluble colorant should be dispersed in the oil phase of the product.

U.S. Pat. No. 5,417,990 teaches a water-soluble complex for multi-layered and multi-coloured gelled products, which comprises water soluble colorants and complexing agents (polyamino acids and protein materials). Due to its size the water-soluble complex does not migrate within the gel matrix and does not migrate into the adjacent layer. It is obvious that the application of a specific complexing agent is necessary to prevent the colorants from migration.

U.S. Pat. No. 6,294,213 reported a multi-layered, gel-based dessert product with reduced colour migration, wherein at least one of the contained colorants being a negatively charged caramel colorant.

US 2003/044494A1 discloses a multilayer gel-based food product, comprising a first milk-based, gel-based layer containing a dispersed oil phase and an oil soluble colour within the oil phase, and a second gel-based layer adjacent the first gel-based layer and having a second colour different from the first colour. However a prerequisite is that there is colloidal oil phase presenting in the multilayer gel-based food product.

Therefore there is still a significant need to develop a new and widely-applicable delivery system for food additives with improved stability and retainability for using in multilayer food product. The new food additives delivery system should on one hand possess improved stability during the preparation process, particular the heat treatment, and on the other hand should be stably retained in the targeted layer of a multilayer aqueous-based food product.

DESCRIPTION OF THE INVENTION

The present invention concerns firstly a delivery system for food additives, comprising or consisting of the following components:
(a) at least one food additive dissolved in a solvent and
(b) at least one o/w emulsifier and/or at least one hydrocolloid dissolved in water, wherein the delivery system is an oil-in-water emulsion.

According to the present invention the food additives are oil-soluble substances and dissolved in a non-polar solvent to form an oil phase as component (a). The component (b)

of the delivery system is a continuous aqueous phase. The oil phase is homogenously dispersed in the aqueous phase to form the oil-in-water emulsion.

According to the present invention the ratio between the component (a) and the component (b) is from about 1:4 to about 1:12.

According to the present invention, when the delivery system comprises emulsifier and hydrocolloid the ratio between the emulsifier and the hydrocolloid is from about 1:1 to about 1:10.

The present invention concerns also a multilayer food product, comprising:
(1) at least one upper food layer, and
(2) at least one lower food layer,
wherein at least one of the food layer comprises the delivery system for food additives of the present invention.

According to the present invention the multilayer food product is preferably an aqueous-based food product and comprises more than about 50 wt.-% water.

It has been surprisingly observed that the delivery system for food additives of the present invention possesses improved stability during the preparation process, especially the heat treatment of food products. Besides, during the storage of multilayer food products the food additives loaded in the delivery system of the present invention, are prevented to a great extent from the migration from one layer into another layer of the food products. The multilayer food products can maintain its original colour and flavour till consumed and bring the consumers the best sensory feeling. Besides, by adding food additives especially flavour compounds through the delivery system of the present invention the intensity of the delivered flavour is also significantly increased.

Food Additives

In the present invention the food additives specify substances, especially oil-soluble substances for enhancing the wanted taste, colour and aroma of food products. In other words the food additives of the present invention are preferably selected from aroma or flavour compounds, food dyes, and sweeteners.

Aroma or Flavour Compounds

Aroma or flavour compounds can be chosen from synthetic flavouring liquid and/or oils derived from plants leaves, flowers, fruits and so forth, and combinations thereof. Representative flavouring liquids include: artificial, natural or synthetic fruit flavours such as *eucalyptus*, lemon, orange, banana, grape, lime, apricot and grapefruit oils and fruit essences including apple, strawberry, cherry, orange, pineapple and so forth; bean and nut derived flavours such as coffee, cocoa, cola, peanut, almond and so forth; and root derived flavours such as licorice or ginger.

The flavour compounds is preferably selected from the group consisting of essential oils and extracts, tinctures and balsams, such as, for example, anisole, basil oil, bergamot oil, bitter almond oil, camphor oil, citronella oil, lemon oil; *Eucalyptus citriodora* oil, *eucalyptus* oil, fennel oil, grapefruit oil, camomile oil, spearmint oil, caraway oil, lime oil, mandarin oil, nutmeg oil (in particular nutmeg blossom oil=maces oil, mace oil), myrrh oil, clove oil, clove blossom oil, orange oil, oregano oil, parsley (seed) oil, peppermint oil, rosemary oil, sage oil (clary sage, Dalmatian or Spanish sage oil), star aniseed oil, thyme oil, vanilla extract, juniper oil (in particular juniper berry oil), wintergreen oil, cinnamon leaf oil; cinnamon bark oil, and fractions thereof, or constituents isolated therefrom.

Typical flavour compounds comprise: acetophenone, allyl caproate, alpha-ionone, beta-ionone, anisaldehyde, anisyl acetate, anisyl formate, benzaldehyde, benzothiazole, benzyl acetate, benzyl alcohol, benzyl benzoate, beta-ionone, butyl butyrate, butyl caproate, butylidene phthalide, carvone, camphene, caryophyllene, cineole, cinnamyl acetate, citral, citronellol, citronellal, citronellyl acetate, cyclohexyl acetate, cymene, damascone, decalactone, dihydrocoumarin, dimethyl anthranilate, dimethyl anthranilate, dodecalactone, ethoxyethyl acetate, ethyl butyric acid, ethyl butyrate, ethyl caprate, ethyl caproate, ethyl crotonate, ethylfuraneol, ethylguaiacol, ethyl isobutyrate, ethyl isovalerate, ethyl lactate, ethyl methyl butyrate, ethyl propionate, eucalyptol, eugenol, ethyl heptylate, 4-(p-hydroxyphenyl)-2-butanone, gamma-decalactone, geraniol, geranyl acetate, grapefruit aldehyde, methyl dihydrojasmonate (e.g. Hedion®), heliotropin, 2-heptanone, 3-heptanone, 4-heptanone, trans-2-heptenal, cis-4-heptenal, trans-2-hexenal, cis-3-hexenol, trans-2-hexenoic acid, trans-3-hexenoic acid, cis-2-hexenyl acetate, cis-3-hexenyl acetate, cis-3-hexenyl caproate, trans-2-hexenyl caproate, cis-3-hexenyl formate, cis-2-hexyl acetate, cis-3-hexyl acetate, trans-2-hexyl acetate, cis-3-hexyl formate, para-hydroxybenzylacetone, isoamyl alcohol, isoamyl isovalerate, isobutyl butyrate, isobutyraldehyde, isoeugenol methyl ether, isopropyl methyl thiazole, lauric acid, levulinic acid, linalool, linalool oxide, linalyl acetate, menthol, menthofuran, methylanthranilate, methylbutanol, methylbutyric acid, 2-methylbutyl acetate, methyl caproate, methyl cinnamate, 5-methylfurfural, 3,2,2-methylcyclopentenolone, 6,5,2-methylheptenone, methyldihydrojasmonate, methyl jasmonate, 2-methyl methylbutyrate, 2-methyl-2-pentenolic acid, methyl thiobutyrate, 3,1-methylthiohexanol, 3-methylthiohexyl acetate, nerol, neryl acetate, trans, trans-2,4-nonadienal, 2,4-nonadienol, 2,6-nonadienol, 2,4-nonadienol, nootcatone, delta octalactone, gamma-octalactone, 2-octanol, 3-octanol, 1,3-octenol, 1-octyl acetate, 3-octyl acetate, palmitic acid, paraldehyde, phellandrene, pentanedione, phenylethyl acetate, phenylethyl alcohol, phenylethyl isovalerate, piperonal, propionaldehyde, propyl butyrate, pulegone, pulegol, sinensal, sulfurol, terpinene, terpineol, terpinolene, 8,3-thiomenthanone, 4,4,2-thiomethylpentanone, thymene, delta-undecalactone, gamma-undecalactone, valencene, valeric acid, vanillin, acetoin, ethylvanillin, ethylvanillin isobutyrate (=3-ethoxy-4-isobutyryloxybenzaldehyde), 2,5-dimethyl-4-hydroxy-3 (2H)furanone and derivatives thereof (here preferably homofuraneol (=2-ethyl-4-hydroxy-5-methyl-3(2H)furanone), homofuronol (=2-ethyl-5-methyl-4-hydroxy-3(2H) furanone and 5-ethyl-2-methyl-4-hydroxy-3(2H)-furanone), maltol and maltol derivatives (here, preferably ethylmaltol), coumarin and coumarin derivatives, gamma-lactones (here preferably gamma-undecalactone, gamma-nonalactone, gamma-decalactone), delta-lactones (here preferably 4-methyldeltadecalactone, massoilactone, deltadecalactone, tuberolactone), methyl sorbate, divanillin, 4-hydroxy-2(or 5)-ethyl-5(or 2)-methyl-3(2H)furanone, 2-hydroxy-3-methyl-2-cyclopentenone, 3-hydroxy-4,5-dimethyl-2(5H)-furanone, acetic acid isoamyl ester, butyric acid ethyl ester, butyric acid n-butyl ester, butyric acid isoamyl ester, 3-methylbutyric acid ethyl ester, n-hexanoic acid ethyl ester, n-hexanoic acid allyl ester, n-hexanoic acid-n-butyl ester, n-octanoic acid ethyl ester, ethyl-3-methyl-3-phenyl glycidate, ethyl-2-trans-4-cisdecadienoate, 4-(p-hydroxyphenyl)-2-butanone, 1,1-dimethoxy-2,2,5-trimethyl-4-hexane, 2,6-dimethyl-5-hepten-1-al and phenylacetaldehyde, 2-methyl-3-(methylthio)furan, 2-methyl-3-furanthiol, bis(2-methyl-3-furyl)disulphide, furfurylmercaptan, methional, 2-acetyl-2-thiazoline, 3-mercapto-2-pentanone, 2,5-dimethyl-3-furanthiol, 2,4,5-trimethylthiazole, 2-acetylthiazole, 2,4- dimethyl-5-ethylthiazole, 2-acetyl-1-pyrroline, 2-methyl-3-ethylpyrazine, 2-ethyl-3,5-dimethylpyrazine, 2-ethyl-3,6-dimethylpyrazine, 2,3-diethyl-5-methylpyrazine, 3-isopropyl-2-methoxypyrazine, 3-isobutyl-2-methoxypyrazine, 2-acetylpyrazine, 2-pentylpyridine, (E,E)-2,4-decadienal, (E,E)-2,4-nonadienal, (E)-2-octenal, (E)-2-nonenal, 2-undecenal, 12-methyltridecanal, 1-penten-3-one, 4-hydroxy-2,5-dimethyl-3(2H)-furanone, guaiacol, 3-hydroxy-4,5-dimethyl-2(5H)-furanone, 3-hydroxy-4-methyl-5-ethyl-2(5H) furanone, cinnamaldehyde, cinnamal alcohol, methyl salicylate, isopulegol and also (here not explicitly stated) stereoisomers, enantiomers, positional isomers, diastereomers, cis/transisomers and/or epimers of said substances.

According to the present invention the preferred food additives are aroma or flavour compounds, preferably selected from group comprising: flavour compounds with a boiling point above 120° C. and a log P (o/w) value of above 1 like oil soluble sweet fruit flavours like blueberry flavours, strawberry flavours, raspberry flavours, cherry flavours, peach or mango flavours and oil soluble brown sweet flavours like nut flavours, caramel flavours, chocolate flavours, toffee flavours, vanilla flavours, coffee flavours. Especially preferred sweet flavours are blueberry, strawberry, cherry and nut flavours.

The typical flavour ingredients contained in the flavour compounds comprise essential oils, fruit esters, alcohols comprising between three and sixteen carbon atoms per molecule and containing only one hydroxyl group per molecule, aldehydes comprising between three and sixteen carbon atoms per molecule, organic acids comprising between three and sixteen carbon atoms per molecule, organic esters comprising between three and sixteen carbon atoms per molecule, lactones of the general formula C—H$_{2x-2}$O$_2$ with x equals 5 to 18 and ketones comprising between four and fourteen carbon atoms per molecule, for example cis-3-hexen-1-ol (hexenol 3z), ethylmethylbutyrate-2, ethylcapronate, capronic acid, dodecalactone-delta, 2-methylbutyric acid, gamma-decalactone, limonene, (E)-2-hexen-1-ol, maltol, (3Z)-3-Hexenyl acetate, vanillin.

Food Dyes

Food dyes are used for colouring foods. Food dyes are subdivided into the groups of natural dyes and synthetic dyes. The nature-identical dyes are likewise of synthetic origin. The nature-identical dyes are synthetic reproductions of colouring substances occurring in nature. Suitable dyes for use in the present composition are selected from: curcumin, E 100 riboflavin, lactoflavin, Vitamin B2, E 101 tartrazine, E 102 quinoline yellow, E 104 yellow orange S, yellow orange RGL, E 110 cochenille, carminic acid, true carmine, E 120 azorubin, carmoisine, E 122 amaranth, E 123 cochenille red A, ponceau 4 R, Victoria scarlet 4 R, E 124 erythrosine, E 127 allura red AC, E 129 patent blue V, E 131 indigotin, indigo carmine, E 132 brilliant blue FCF, patent blue AE, amidoblue AE, E 133 chlorophylls, chlorophyllins, E 140 copper complexes of chlorophylls, copper-chlorophyllin complex, E 141 brilliant acid green, green S, E 142 caramel colour, alkali-, E 150 a sulphite caramel colour, E 150 b ammonia caramel colour, E 150 c ammonium sulphite caramel colour, E 150 d brilliant black FCF, brilliant black PN, black PN, E 151 vegetable black, E 153 brown FK, E 154 brown HT, E 155 carotene, E 160 a annatto, bixin, norbixin, E 160 b capsanthin, capsorubin, E 160 c lycopene, E 160 d beta-apo-8'-carotenal, apocarotenal, beta-apocarotenal, E 160 e beta-apo-8'-carotenic acid ethyl ester (C30), apocarotenic ester, beta-carotenic acid ester, E 160 f lutein, xanthophyll, E 161 b canthaxanthin, E 161 g betanin, beet red, E 162 anthocyans, E 163 calcium carbonate, E 170 titanium dioxide, E 171 iron oxides, iron hydroxides, E 172 aluminium, E 173 silver, E 174 gold, E 175 lithol rubine BK, rubine pigment BK, E 180.

Sweeteners

The term "sweeteners" denotes substances having a relative sweetening power of at least 25, based on the sweetening power of sucrose (which accordingly has a sweetening power of 1). Sweeteners to be used in an orally consumable product (in particular foodstuff, feed or medicament) according to the invention (a) are preferably non-cariogenic and/or have an energy content of not more than 5 kcal per gram of the orally consumable product.

Advantageous sweeteners according to the present invention are selected from the following groups:

Naturally occurring sweeteners, preferably selected from the group comprising
  miraculin, monellin, mabinlin, thaumatin, curculin, brazzein, pentaidin, Dphenylalanine, D-tryptophan, and extracts or fractions obtained from natural sources, comprising those amino acids and/or proteins, and the physiologically acceptable salts of those amino acids and/or proteins, in particular the sodium, potassium, calcium or ammonium salts;
  neohesperidin dihydrochalcone, naringin dihydrochalcone, stevioside, steviolbioside, rebaudiosides, in particular rebaudioside A, rebaudioside B, rebaudioside C, rebaudioside D, rebaudioside E, rebaudioside F, rebaudioside G, rebaudioside H, dulcosides and rubusoside, suavioside A, suavioside B, suavioside G, suavioside H, suavioside I, suavioside J, baiyunoside 1, baiyunoside 2, phlomisoside 1, phlomisoside 2, phlomisoside 3 and phlomisoside 4, abrusoside A, abrusoside B, abrusoside C, abrusoside D, cyclocaryoside A and cyclocaryoside I, osladin, polypodoside A, strogin 1, strogin 2, strogin 4, selligueain A, dihydroquercetin 3-acetate, perillartin, telosmoside A$_{15}$, periandrin I-V, pterocaryosides, cyclocaryosides, mukuroziocides, trans-anethole, transcinnamaldehyde, bryosides, bryonosides, bryonodulcosides, carnosiflosides, scandenosides, gypenosides, trilobatin, phloridzin, dihydroflavanols, hematoxylin, cyanin, chlorogenic acid, albiziasaponin, telosmosides, gaudichaudioside, mogrosides, mogroside V, hernandulcins, monatin, phyllodulcin, glycyrrhetinic acid and derivatives thereof, in particular glycosides thereof such as glycyrrhizine, and the physiologically acceptable salts of those compounds, in particular the sodium, potassium, calcium or ammonium salts;
  extracts or concentrated fractions of the extracts, selected from the group comprising thaumatococcus extracts (katamfe plant), extracts from *Stevia* ssp. (in particular *Stevia rebaudiana*), swingle extracts (*Momordica* or *Siratia grosvenorii*, Luo-Han-Guo), extracts from *Glycerrhyzia* ssp. (in particular *Glycerrhyzia glabra*), extracts from *Rubus* ssp. (in particular *Rubus suavissimus*), citrus extracts and extracts from *Lippia dulcis;*

Synthetic sweet-tasting substances are preferably selected from the group comprising magap, sodium cyclamate or other physiologically acceptable salts of cyclamic acid, acesulfame K or other physiologically acceptable salts of acesulfame, neohesperidin dihydrochalcone, naringin dihydrochalcone, saccharin, saccharin sodium salt, aspartame, superaspartame, neotame, alitame, advantame, perillartin, sucralose, lugduname, carrelame, sucrononate and sucrooctate.

According to the present invention the most preferred food additives are aroma or flavour compounds.

Solvents

In the present invention the solvent means any solvents, especially non-polar solvents allowable in food products, comprising but not limited to triglycerides such as Mygliol, medium chain triglyceride oil, rapeseed oil, canola oil, soy oil, milk fat, propylene glycol, glycerol, citrus oils, and citrus oil terpenes.

The term medium chain triglyceride (MCT) refers to triglyceride which is composed of a glycerol backbone and three saturated fatty acids with chain length of 6-12 carbons. MCT Oils are usually produced from vegetable fat sources by hydrolyzation, vaporization and reesterification. MCT oils are stable against oxidation, taste neutral, low viscous and have excellent spreading properties.

According to the present invention the preferable non-polar solvents are MCT oils.

According to the present invention a food additive is dissolved into a non-polar solvent in a concentration of about 10 wt.-% to about 99 wt. %, and the amount of the solvent is about 90 wt.-% to about 1 wt.-%. The concentration of the food additive is preferably in about 50 wt.-% to about 97 wt.-%, and more preferably in about 70 wt.-% to about 95 wt.-%.

Oil-in Water Emulsions

Oil-in water emulsion of the present invention means a system comprising two phases: an aqueous phase, which is the continuous phase and an oil phase, which is the dispersed phase that is homogeneously distributed in the continuous aqueous phase.

According to the present invention the components (a) and (b) of the delivery system for food additives is respectively the dispersed oil phase and the continuous aqueous phase, wherein the dispersed oil phase in the continuous aqueous phase possesses a droplet size (d90) of about 0.01 μm to about 100 μm, preferably about 0.1 μm to about 20 μm and more preferably about 0.2 μm to about 10 μm.

Emulsifiers

Emulsifiers are distinguished by the important property of being soluble not only in water but also in fat. Emulsifiers generally consist of fat-soluble part and a water-soluble part. Emulsifiers are always used when water and oil are to be brought into a stable homogeneous mixture.

Suitable emulsifiers which are used in the food-processing industry are selected from: ascorbyl palmitate (E 304), lecithin (E 322), phosphoric acid (E 338), sodium phosphate (E 339), potassium phosphate (E 340), calcium phosphate (E 341), magnesium orthophosphate (E 343), propylene glycol alginate (E 405), polyoxyethylene(8)stearate (E 430), polyoxyethylene stearate (E 431), ammonium phosphatides (E 442), sodium phosphate and potassium phosphate (E 450), sodium salts of edible fatty acids (E 470 a), mono- and diglycerides of edible fatty acids (E 471), acetic acid monoglycerides (E 472 a), lactic acid monoglycerides (E 472 b), citric acid monoglycerides (E 472 c), tartaric acid monoglycerides (E 472 d), diacetyltartaric monoglycerides (E 472 e), sugar esters of edible fatty acids (E 473), sugar glycerides (E 474), polyglycerides of edible fatty acids (E 475), polyglycerol polyricinoleate (E 476), propylene glycol esters of edible fatty acids (E 477), sodium stearoyl lactylate (E 481), calcium stearoyl-2-lactylate (E 482), stearyl tartrate (E 483), sorbitan monostearate (E 491), stearic acid (E 570), gum arabic, modified starch (E1450), whey proteines, lecithines, polysorbates or sucrose esters.

According to the present invention the preferred emulsifiers are gum arabic, modified starch (E1450), propylene glycol alginate, sucrose esters and polysorbates.

According to the present invention the more preferred emulsifiers are gum arabic and modified starch (E1450).

Gum arabic comprises colourless to brown, matte, brittle, odourless pieces having a glossy fracture or powders which dissolve in warm water to give a clear, viscous, tacky, insipid-tasting and weakly acidic liquid. Gum arabic is substantially insoluble in alcohol. The substance consists mainly of the acidic alkaline earth metal and alkali metal salts of so-called arabic acid (polyarabic acid), which is understood as meaning a branched polysaccharide consisting of L-arabinose, D-galactose, L-rhamnose and D-glucuronic acid in the ratio 3:3:1:1.

According to the present invention the ratio of emulsifiers, based on the total amount of the delivery system, is from about 0.1 b.w. % to about 25 b.w. %, preferably from about 5 b.w. % to about 23 b.w. %, and more preferably from about 10 b.w. % to about 22 b.w. %.

Hydrocolloids

As used herein, the term "hydrocolloid" refers to any colloid system having colloid particles that are dispersed in water. It is well known in the art that hydrocolloids can exist in various states, including, for example, as a gel or liquid (sol). The hydrocolloid of the present invention can be either reversible or irreversible (i.e., in a single state). The hydrocolloid of the present invention is one that is edible to the extent that it can be used in food products.

Suitable hydrocolloid are selected from the group consisting of pectins, galaktomannans, xanthan gum, guar gum, carob bean gum, gellan gum, alginate, gelatin, agar-agar, carrageenan, locust bean gum, xanthan, carboxymethylcellulose, sodium alginate, whey protein and its derivatives and the mixtures thereof.

Pectins are plant-based polysaccharides, which essentially consist of alpha-(1-4)linked D-galacturonic acid units. From a nutrition physiology point of view, pectins represent dietary fibres for humans.

Galactomannans represent substances similar to starch which are composed of carbohydrate chains. The backbone consists of mannose, from which short side groups of galactose molecules branch off.

Xanthan gum is a natural thickener and gel former (E 415). It is obtained from sugarcontaining substrates using bacteria of the genus *Xanthomonas* and is approved for use in organic foods.

Guar, or guar gum (E 412), essentially consists of the polysaccharide guaran. It is obtained by separating the outer layers and the seedling from the seed of the guar plant and subsequent milling.

Gellan gum also belongs to the polysaccharides. It has a linear structure and consists of a residue of rhamnose, one residue of glucoronic acid and two residues of glucose as monomer, which are esterified with acetic acid and glyceric acid. The molar mass amounts to approximately 500,000 Dalton.

According to the present invention the preferred hydrocolloid are guar gum, locust bean gum, pectine, gelatine, sodium alginate and whey protein.

According to the present invention the more preferred hydrocolloid are pectin, gelatine, sodium alginate and whey protein.

According to the present invention the ratio of hydrocolloid, based on the total amount of the delivery system, is from about 0.05 b.w. % to about 5 b.w. %, preferably from about 0.1 b.w. % to about 2 b.w. %, and more preferably from about 0.2 b.w. % to about 1 b.w. %.

In one preferred embodiment the delivery system for food additives of the present invention comprising or consisting of the following components:
  (a) at least one food additive dissolved in a solvent, wherein the food additive is flavour compound selected from oil soluble sweet fruit flavours and oil soluble brown sweet flavours, and the solvent is selected from MCT oils, and
  (b) at least one emulsifier dissolved in water, wherein the emulsifier is selected from gum arabic, modified starch (E1450), propylene glycol alginate, sucrose esters and polysorbates.

In another preferred embodiment the delivery system for food additives of the present invention comprising or consisting of the following components:
(a) at least one food additive dissolved in a solvent, wherein the food additive is flavour compound selected from oil soluble sweet fruit flavours and oil soluble brown sweet flavours, and the solvent is selected from MCT oils, and
(b) at least one hydrocolloid dissolved in water, wherein the hydrocolloid is selected from guar gum, locust bean gum, pectin, gelatine, sodium alginate and whey protein.

In another preferred embodiment the delivery system for food additives of the present invention comprising or consisting of the following components:
  (a) at least one food additive dissolved in a solvent, wherein the food additive is flavour compound selected from oil soluble sweet fruit flavours and oil soluble brown sweet flavours, and the solvent is selected from MCT oils, and
  (b) at least one emulsifier and at least one hydrocolloid dissolved in water, wherein the emulsifier is selected from gum arabic, modified starch (E1450), propylene glycol alginate, sucrose esters and polysorbates, and the hydrocolloid is selected from guar gum, locust bean gum, pectin, gelatine, sodium alginate and whey protein.

Multilayer Food Products

In terms of the present invention a multilayer food product means a product comprising at least two, three, four or more layers, preferably comprising only two layers (bilayer product).

In one embodiment of the present invention the bilayer aqueous-based product comprises one milk-based layer and one fruit-based layer, wherein the food additives delivery system is added into the milk-based layer and/or the fruit-based layer, preferably in the fruit-based layer.

Milk-Based Layer

In one embodiment the milk-based layer is a yogurt, quark, curd product layer or a pudding layer.

Fruit-Based Layer

In another embodiment the fruit-based layer is a fruit preparation comprising fruits or its derivatives (fresh fruit, concentrated fruit, dehydrated fruit, candified fruit), one or more hydrocolloids as defined above, such as pectin, starch, alginate, locust bean gum, guar gum, xanthan, carrageenan, citric acid or other food acids, a sugar (sucrose, invert sugar syrup, glucose syrup) and potentially a stabilizer such as sorbate or benzoate.

In one preferred embodiment the milk-based layer is above the fruit-based layer.

In another preferred embodiment the milk-based layer is below the fruit-based layer.

In one preferred embodiment of the present invention the ratio between the milk-based layer and the fruit-based in the bilayer aqueous-based gel product layer is 5:1.

The amount of the food additives delivery system is about 0.001 wt. % to about 2 wt. %, preferably about 0.01 wt. % to about 1 wt. %, and more preferably in about 0.05 wt. % to about 0.2 wt. %, based on the total amount of the obtained final food products.

The food product of the present invention still comprises other commonly used additive components in the milk-based layer and/or the fruit-based layer, comprising but not limited to acid regulators, vitamins, flavour enhancers, thickeners, antioxidants, active substances for masking unpleasant taste impressions and so on.

Acid Regulators

Acid regulators are food additives which keep the acidity or the basicity and hence the desired pH of a food constant. These are mostly organic acids and salts thereof, carbonates, and more seldom also inorganic acids and salts thereof. The addition of an acid regulator somewhat reinforces the stability and firmness of the food, causes a desired precipitation and improves the action of preservatives. In contrast to acidifiers, they are not utilized for flavour modification of foods. Their action is based on the formation of a buffer system in the food, with which the pH changes only slightly or not at all on addition of acidic or basic substances. Examples are:

E 170—Calcium carbonate
E 260-263—Acetic acid and acetates
E 270—Lactic acid
E 296—Malic acid
E 297—Fumaric acid
E 325-327—Lactates (lactic acid)
E 330-333—Citric acid and citrates
E 334-337—Tartaric acid and tartrates
E 339-341—Orthophosphates
E 350-352—Malates (malic acid)
E 450-452—Di-, tri- and polyphosphates
E 500-504—Carbonates (carbonic acid)
E 507—Hydrochloric acid and chlorides
E 513-517 Sulphuric acid and sulphates
E 524-528 Hydroxides
E 529-530 Oxides
E 355-357 Adipic acid and adipates
E 574-578 Gluconic acid and gluconates Vitamins In a further embodiment of the present invention, as a further optional group of additives, the food additives can contain vitamins. Vitamins have a great variety of biochemical modes of action. Some act similarly to hormones and regulate the mineral metabolism (e.g. vitamin D), or act on the growth of cells and tissue and cell differentiation (e.g. some forms of vitamin A). Others are antioxidants (e.g. vitamin E and under certain circumstances also vitamin C). The majority of vitamins (e.g. the B vitamins) are precursors for enzymatic cofactors, which support enzymes in catalysing certain processes in the metabolism. In this connection, vitamins can sometimes be tightly bound to the enzymes, for example as part of the prosthetic group: one example of this is biotin, which is a part of the enzyme which is responsible for the construction of fatty acids. On the other hand, vitamins can also be less strongly bound and then act as cofactors, for example as groups which can be easily cleaved off and transport chemical groups or electrons between the molecules. Thus for example folic acid transports methyl, formyl and methylene groups into the cell. Although their support in enzyme-substrate reactions is well known, their other properties are also of great importance to the body.

In the context of the present invention, substances are possible as vitamins which are selected from the group consisting of Vitamin A (retinol, retinal, beta-carotene),
Vitamin $B_1$ (thiamine),
Vitamin $B_2$ (riboflavin),
Vitamin $B_3$ (niacin, niacinamide),
Vitamin $B_5$ (pantothenic acid),
Vitamin $B_6$ (pyridoxine, pyridoxamine, pyridoxal),
Vitamin $B_7$ (biotin),
Vitamin $B_9$ (folic acid, folinic acid),
Vitamin $B_{12}$ (cyanocobalamin, hydroxycobalamin, methylcobalamin),
Vitamin C (ascorbic acid),
Vitamin D (cholecalciferol),
Vitamin E (tocopherols, tocotrienols) and
Vitamin K (phylloquinone, menaquinone).

The preferred vitamins, as well as ascorbic acid, are the group of the tocopherols.

Flavour Enhancers

Flavour enhancers enhance a food's existing flavours. They may be extracted from natural sources (through distillation, solvent extraction, maceration, among other methods) or created artificially. In addition, flavour enhancers preferred according to the invention can also comprise flavourings for masking bitter and/or astringent taste impressions (taste correctors). The (further) taste correctors are selected, e.g. from the following list: nucleotides (e.g. adenosine 5'-monophosphate, cytidine 5'-monophosphate) or pharmaceutically acceptable salts thereof, lactisols, sodium salts (e.g. sodium chloride, sodium lactate, sodium citrate, sodium acetate, sodium gluconoate), further hydroxy flavanones (e.g. eriodictyol, homoeriodictyol or sodium salts thereof), in particular according to US 2002/0188019, hydroxybenzamides according to DE 10 2004 041 496 (e.g. 2,4-dihydroxybenzoic acid vanillylamide, 2,4-dihydroxybenzoic acid N-(4-hydroxy-3-methoxybenzyl)amide, 2,4,6-trihydroxybenzoic acid N-(4-hydroxy-3-methoxybenzyl)amide, 2-hydroxybenzoic acid N-4-(hydroxy-3-methoxybenzyl)amide, 4-hydroxybenzoic acid N-(4-hydroxy-3-methoxybenzyl)amide, 2,4-dihydroxybenzoic acid N-(4-hydroxy-3-methoxybenzyl)amide monosodium salt, 2,4-dihydroxybenzoic acid N-2-(4-hydroxy-3-methoxyphenyl)ethylamide, 2,4-dihydroxybenzoic acid N-(4-hydroxy-3-ethoxybenzyl)amide, 2,4-dihydroxybenzoic acid N-(3,4-dihydroxybenzyl)amide and 2-hydroxy-5-methoxy-N-[2-(4-hydroxy-3-methoxyphenyl)ethyl]amide (Aduncamid), 4-hydroxybenzoic acid vanillylamide), bitter-masking hydroxydeoxybenzoin, e.g. according to WO 2006/106023 (e.g. 2-(4-hydroxy-3-methoxy-phenyl)-1-(2,4,6-trihydroxyphenyl)ethanone, 1-(2,4-dihydroxyphenyl)-2-(4-hydroxy-3-methoxyphenyl)ethanone, 1-(2-hydroxy-4-methoxyphenyl)-2-(4-hydroxy-3-methoxyphenyl)ethanone), amino acids (e.g. gamma-aminobutyric acid according to WO 2005/096841 for reducing or masking an unpleasant taste impression such as bitterness), malic acid glycosides according to WO 2006/003107, salt-tasting mixtures according to PCT/EP 2006/067120 diacetyltrimers according to WO 2006/058893, mixtures of whey proteins with lecithins and/or bitter-masking substances such as gingerdiones according to WO 2007/003527.

Thickeners

Advantageous thickeners in a preferred orally consumable product (in particular foodstuff, feed or medicament) according to the invention are selected from the group comprising: crosslinked polyacrylic acids and derivatives thereof, polysaccharides and derivatives thereof, such as pectines, starches, guar gum, locust bean gum xanthan gum, agar-agar, alginates or tyloses, cellulose derivatives, for example carboxymethylcellulose or hydroxycarboxymethylcellulose, fatty alcohols, monoglycerides and fatty acids, polyvinyl alcohol and polyvinylpyrrolidone.

Preference is given according to the invention to an orally consumable product (in particular foodstuff or feed) which comprises milk thickened with lactic acid bacteria and/or cream thickened with lactic acid bacteria and which preferably is selected from the group comprising yoghurt, kefir and quark.

A food composition according to the invention comprising milk thickened with lactic acid bacteria and/or cream thickened with lactic acid bacteria is advantageously an orally consumable product which comprises a probiotic, wherein the probiotic is preferably selected from the group comprising *Bifidobacterium animalis* subsp. *lactis* BB-12, *Bifidobacterium animalis* subsp. *lactis* DN-173 010, *Bifidobacterium animalis* subsp. *lactis* HNO19, *Lactobacillus acidophilus* LA5, *Lactobacillus acidophilus* NCFM, *Lactobacillus johnsonii* La1, *Lactobacillus casei* immunitass/defensis, *Lactobacillus casei* Shirota (DSM 20312), *Lactobacillus casei* CRL431, *Lactobacillus reuteri* (ATCC 55730) and *Lactobacillus rhamnosus* (ATCC 53013).

Antioxidants

In the food industry, both natural and also artificial antioxidants are used. Natural and artificial antioxidants differ first and foremost in that the former occur naturally in the food and the latter are produced artificially. Thus natural antioxidants, so that they can be used as food additives, are for example obtained from plant oils. Vitamin E, also known as tocopherol, is for example often produced from soya oil. Synthetic antioxidants such as propyl gallate, octyl gallate and dodecyl gallate are on the other hand obtained by chemical synthesis. The gallates can trigger allergies in sensitive persons. Further antioxidants usable in compositions of the present invention are: sulphur dioxide, E 220, sulphites sodium sulphite, E 221, sodium hydrogen sulphite, E 222, sodium disulphite, E 223, potassium disulphite, E 224, calcium sulphite, E 226, calcium hydrogen sulphite, E 227, potassium hydrogen sulphite, E 228, lactic acid, E 270, ascorbic acid, E 300, sodium L-ascorbate, E 301, calcium L-ascorbate, E 302, ascorbic acid esters, E 304, tocopherol, E 306, alpha-tocopherol, E 307, gamma-tocopherol, E 308, delta-tocopherol, E 309, propyl gallate, E 310, octyl gallate, E 311, dodecyl gallate, E 312, isoascorbic acid, E 315, sodium isoascorbate, E 316, tertiary-butylhydroquinone (TBHQ), E 319, butylhydroxyanisole, E 320, butylhydroxytoluene, E 321, lecithin, E 322, citric acid, E 330, salts of citric acid (E 331 & E 332) sodium citrate, E 331, potassium citrate, E 332, calciumdisodium EDTA, E 385, diphosphates, E 450, disodium diphosphate, E 450a, trisodium diphosphate, E 450b, tetrasodium diphosphate, E 450c, dipotassium diphosphate, E 450d, tripotassium diphosphate, E 450e, dicalcium diphosphate, E 450f, calcium dihydrogen diphosphate, E 450g, triphosphates, E 451, pentasodium triphosphate, E 451a, pentapotassium triphosphate, E 451b, polyphosphate, E 452, sodium polyphosphate, E 452a, potassium polyphosphate, E 452b, sodium calcium polyphosphate, E 452c, calcium polyphosphate, E 452d, and tin-II chloride, E 512.

Active Substances for Masking Unpleasant Taste Impressions

Furthermore, the oral preparations can also contain further substances which also serve for masking bitter and/or astringent taste impressions. These further taste correctors are for example selected from the following list: nucleotides (e.g. adenosine-5'-monophosphate, cytidine-5'-monophosphate) or physiologically acceptable salts thereof, lactisols, sodium salts (e.g. sodium chloride, sodium lactate, sodium citrate, sodium acetate, sodium gluconate), hydroxyflavanones, here preferably eriodictyol, sterubin (eriodictyol-7-methyl ether), homoeriodictyol, and sodium, potassium, calcium, magnesium or zinc salts thereof (in particular those as described in EP 1258200 A2, which concerning the relevant compounds disclosed therein by way of reference becomes a component of this application), hydroxybenzoic acid amides, here preferably 2,4-dihydroxybenzoic acid vanillylamide, 2,4-dihydroxybenzoic acid-N-(4-hydroxy-3-methoxybenzyl)amide, 2,4,6-trihydroxybenzoic acid-N-(4-hydroxy-3-methoxybenzyl)amide, 2-hydroxybenzoic acid-N-4-(hydroxy-3-methoxybenzyl)amide, 4-hydroxybenzoic acid-N-(4-hydroxy-3-methoxybenzyl)amide, 2,4-dihydroxybenzoic acid-N-(4-hydroxy-3-methoxy-benzyl)amide monosodium salt, 2,4-dihydroxybenzoic acid-N-2-(4-hydroxy-3-methoxy-phenyl)ethylamide, 2,4-dihydroxybenzoic acid-N-(4-hydroxy-3-ethoxybenzyl)amide, 2,4-dihydroxybenzoic acid-N-(3,4-dihydroxybenzyl)amide and 2-hydroxy-5-methoxy-N-[2-(4-hydroxy-3-methoxyphenyl) ethyl]amide; 4-hydroxybenzoic acid vanillylamides (in particular those as described in WO 2006/024587, which concerning the relevant compounds disclosed therein by way of reference becomes a component of this application); hydroxydeoxybenzoins, here preferably 2-(4-hydroxy-3-methoxyphenyl)-1-(2,4,6-trihydroxyphenyl)ethanone, 1-(2, 4-dihydroxyphenyl)-2-(4-hydroxy-3-methoxyphenyl)-ethanone and 1-(2-hydroxy-4-methoxy-phenyl)-2-(4-hydroxy-3-methoxyphenyl)ethanone) (in particular those as described in WO 2006/106023, which concerning the relevant compounds disclosed therein by way of reference becomes a component of this application); hydroxyphenylalkanediones, such as for example gingerdione-[2], gingerdione-[3], gingerdione-[4], dehydrogingerdione-[2], dehydrogingerdione-[3], dehydrogingerdione-[4]) (in particular those as described in WO 2007/003527, which concerning the relevant compounds disclosed therein by way of reference becomes a component of this application); diacetyl trimers (in particular those as described in WO 2006/058893, which concerning the relevant compounds disclosed therein by way of reference becomes a component of this application); gamma-aminobutyric acids (in particular those as described in WO 2005/096841, which concerning the relevant compounds disclosed therein by way of reference becomes a component of this application); divanillins (in particular those as described in WO 2004/078302, which concerning the relevant compounds disclosed therein by way of reference becomes a component of this application) and 4-hydroxydihydrochalconen (preferably as described in US 2008/0227867 A1, which concerning the relevant compounds disclosed therein by way of reference becomes a component of this application), here in particular phloretin and davidigenin, amino acids or mixtures of whey proteins with lecithins, hesperetin as disclosed in WO 2007/014879, which concerning these compounds by way of reference becomes a component of this application, 4-hydroxydihydrochalcones as disclosed in WO 2007/107596, which concerning these compounds by way of reference becomes a component of this application, or propenylphenyl glycosides (chavicol glycosides) as described in EP 1955601 A1, which concerning these compounds by way of reference becomes a component of this application, or extracts from *Rubus suavissimus*, extracts from *Hydrangea macrophylla* as described in EP 2298084 A1, pellitorine and derived flavouring compositions as described in EP 2008530 A1, umami compounds as described in WO 2008/046895 A1 and EP 1989944 A1, umami compounds as described in EP 2064959 A1 or EP 2135516 A1, vanillyl lignans, enterodiol, and N-decadienoylamino acids and mixtures thereof.

INDUSTRIAL APPLICATION

The present invention further concerns a process for preparing a food additives delivery system, which possesses improved stability and retainability during the preparation and storage of food products, comprising the steps:
(i) dissolving at least one food additive in a solvent to obtain an oil phase,
(ii) dissolving at least one emulsifier and/or at least one hydrocolloid into water to obtain a aqueous phase
(iii) dispersing the oil phase into the aqueous phase to obtain an oil-in-water emulsion.

The concerned substances in the process of the present invention have the same meaning as defined above and would not be repeated.

According to the present invention the ratio between the oil phase and the aqueous phase is between about 1:4 to about 1:12.

According to the present invention the ratio between the emulsifier and the hydrocolloid is from about 1:1 to about 1:10.

In one preferred embodiment the used food additives are selected from aroma or flavour compounds, food dyes, and sweeteners.

In one more preferred embodiment the food additives are aroma or flavour compounds.

According to the present invention the solvent is preferably non-polar solvent and selected from MCT oils.

According to the present invention the food additive is dissolved in a solvent in a concentration of 10 wt. % to 99 wt. %, and the amount of the solvent is about 90 wt.-% to about 1 wt. %. The concentration of the food additive is preferably lies in about 50 wt.-% to about 97 wt.-%, and more preferably in about 70 wt.-% to about 95 wt.-%.

The dispersed oil phase in the continuous aqueous phase possesses a droplet size (d90) of about 0.01 μm to about 100 μm, preferably about 0.1 μm to about 20 μm and more preferably about 0.2 μm to about 10 μm.

The present invention further concerns use of the delivery system for food additives of the present invention for preventing the migration of food additives, particularly aroma or flavourings compounds, from one layer into another layer in multilayer food products.

The present application further concerns a process for producing a multilayer food product with improved flavour stability and retainability, comprising the following steps:
(i) providing a the delivery system for food additives according to the present invention and
(ii) adding said delivery system into at least one layer of the food product.

EXAMPLES

Example 1

In order to evaluate the flavour retention of the delivery systems of the present invention 17 aroma formulations (Table 1) are produced as following:

Oil soluble substances are blended into non-polar solvent (MCT oil) to obtain the oil phase. Then the emulsifier is dissolved in part of the water to obtain the first aqueous phase. The obtained oil phase and the first aqueous phase are added into a rotor stator system to be homogenized with a 2-stage high pressure homogenizer at 270/30 bar in minimum 2 homogenization steps. Meanwhile the hydrocolloid is dissolved into the remaining water at a proper temperature. The obtained second aqueous phase is then added into the rotor stator system. All the phases are blended at temperature equilibration, pre-homogenized with the rotor-stator system and homogenized completely with a high pressure homogenizer.

flavour sample can suppress the migration of the flavour into the unflavoured layer and simultaneously enhance the flavour intensity in the flavoured layer after shelf life, the produced aroma delivery systems according to the present invention and regular flavour sample are added respectively into a bilayer system.

The typical bilayer system usually consists of a dairy-based layer and a fruit-based layer. The fruit based layer can also comprise other ingredients. In the present invention a non-fruit based model system as well as a fruit based system was used.

Preparation of Fruit Preparation as Fruit-Based Layer

Guar gum is blended with the aqueous phase comprising partial water, sucrose, citric acid and potassium sorbate. Frozen fruit is added to the mixture and heated up to 86° C. Pectin is pre-gelatinized with the remaining water and added

TABLE 1

17 formulations of the food additives delivery systems of the present invention

| Phase | Component | E1 | E2 | E3 | E4 | E5 | E6 | E7 | E8 |
|---|---|---|---|---|---|---|---|---|---|
| Oil phase | blueberry flavour | 66 | 10 | | | | | | |
| | strawberry flavour | | | | | | | | 10 |
| | model fruit flavour | | | 10 | 10 | 10 | 10 | 10 | |
| | MCT oil | 100 | 90 | 90 | 40 | 40 | 40 | 30 | 40 |
| aqueous phase | Water | 572 | 746 | 736 | 896 | 920 | 826 | 940 | 826 |
| | potassium sorbate solution 20% | 10 | 5 | 5 | 5 | | 5 | | 5 |
| | citric acid monohydrate MSF 50% H$_2$O | 22 | 9 | 9 | 9 | | 9 | | 9 |
| hydrocolloid | sodium alginate E 401 | | | | 40 | 15 | | 10 | |
| | gelatine 240 bloom | | | | | 15 | | 20 | |
| | pectin | | | | | | 10 | | 10 |
| emulsifier | gum arabic | 115 | 70 | | | | | | |
| | starch waxy maize E 1450 | | | 150 | | | 100 | | 100 |

| Phase | Component | E9 | E10 | E11 |
|---|---|---|---|---|
| Oil phase | model fruit flavour | 25 | 100 | 10 |
| | MCT oil | 100 | 10 | 100 |
| aqueous phase | water | 749.5 | 683 | 678.5 |
| | potassium sorbate solution 20% | 5 | 5 | 10 |
| hydrocolloid | pectin | | 10 | |
| | xanthan gum | 0.5 | | |
| | locust bean gum powder | | | 1.5 |
| emulsifier | gum arabic | | 190 | 200 |
| | starch waxy maize E 1450 | 120 | | |
| | whey protein isolate | | 2 | |

| Phase | Component | E12 | E13 | E14 | E15 | E16 | E17 |
|---|---|---|---|---|---|---|---|
| Oil phase | blueberry flavour | | | | | 13 | |
| | strawberry flavour | 10 | 10 | 10 | 5 | | 10 |
| | MCT oil | 5 | 5 | 5 | 10 | 2 | 5 |
| aqueous phase | water | 78.4 | 81.6 | 76.6 | 68.6 | 67.4 | 78.2 |
| | citric acid 50% | 0.9 | 0.9 | 0.9 | 0.9 | 1 | 0.9 |
| | potassium sorbate | 0.5 | 0.5 | 0.5 | 0.5 | 1 | 0.5 |
| hydrocolloid | pectin | | | | | 0.6 | |
| emulsifier | starch waxy maize E 1450 | 5 | | 5 | 15 | 15 | 5 |
| | sodium alginate E 401 | 0.2 | 2 | 2 | | | 0.4 |

In the following experiments the flavour compounds used above but without loading into the delivery system of the present invention is directly used as the regular flavour samples to carry out the comparison with the claimed delivery system of the present invention.

In order to verify that the food additives delivery system according to the present invention compared with a regular to the pre-blended mixture. When temperature is reached 86° C., product is held at this temperature for 5 minutes, then flavours delivery systems according to the present invention or the regular flavour sample are added respectively. The obtained fruit preparation is held for further 5 minutes, then is cooled down to 20° C. and stored at 5° C. The compositions are compiled in Table 2:

TABLE 2

Recipe examples of fruit preparation

| Composition | Model system low viscous | Model system high viscous | Strawberry fruit preparation | Blueberry fruit preparation |
|---|---|---|---|---|
| water | 63.58 | 63.15 | 21.8 | 21.2 |
| pectin | 0.5 | 0.8 | 0.25 | 0.5 |
| guar gum | 0.07 | | 0.15 | 0.4 |
| sucrose | 35 | 35 | 27 | 27 |
| citric acid | 0.05 | 0.25 | 0 | 0.1 |
| potassium sorbate 20% | 0.8 | 0.8 | 0.8 | 0.8 |
| strawberry, frozen | 0 | 0 | 50 | |
| blueberry, frozen | 0 | 0 | | 50 |

The dairy-based layer of the bilayer applications is quark or yoghurt.

In the following table the recovery values of regular flavour sample and flavour delivery system after 2 weeks storage in the said model system of bilayer applications (top layer analysis) in %—migration effect are shown in Table 2.

In the present invention recovery value is used as a measurement standard, which is specifically calculated by the following formula:

$$\text{recovery value} = \frac{\text{Flavour amount analyzed in layer after storage of DELIVERY SYSTEM}}{\text{Flavour amount analyzed in layer after storage of REGULAR FLAVOUR}}$$

whereas the flavour amount in the unflavoured layer is determined from GC Analysis as well as from taste intensity (scale from 0-10). A recovery value of below 100% means that the migration of the flavour delivery system in the unflavoured layer is lower than from the regular flavour, i.e. through loading the flavour compound into the delivery system of the present invention the migration of flavour is successfully inhibited.

In the following Table 3 the recovery values from various delivery systems are presented in both high viscous and low viscous top layer.

It can be seen that when the flavour delivery system of the present invention are used in a bilayer applications the recovery values in the unflavoured layer decreased significantly. From this it can be undoubtedly deduced that the flavour delivery system of the present invention possesses a much better flavour retention ability, or in other word, better stability compared with the regular flavour samples.

Besides, the flavour intensity realized by the flavour delivery systems added into a strawberry fruit preparation are also tested and compared with the regular flavour sample and unflavoured control sample.

The flavour intensity is obtained by a quantitative descriptive analysis (QDA) on a scale of 0 to 10 in an internal sensory panel. The "regular flavour" intensity value is set to 5 (Standard) and all other delivery system samples are ranked against it.

The results are shown in Table 4, wherein the flavoured layer is strawberry fruit preparation and unflavoured layer is quark base.

TABLE 3

Recovery Values in unflavoured layer of Regular Flavour Sample and Flavour Delivery System of the present invention in %.

| | RF* | E1 | E2 | E3 | E4 | E5 | E6 | E7 | E8 | E9 | E10 |
|---|---|---|---|---|---|---|---|---|---|---|---|
| Total flavour amount in unflavoured layer high viscous in % | 100 | 83 | 94.2 | 97 | 61 | 95 | 52 | 79 | 73.8 | 94 | 59 |
| Sensory Evaluation of unflavoured layer high viscous (descriptor fruitiness) in % | 100 | 79 | 86.3 | 88 | 48 | 90 | 52 | 52 | 76.5 | 60 | 84 |
| Total Flavour Amount in unflavoured layer low viscous in % | 100 | n.a. | 76.6 | 40 | 32 | 28 | 57 | 58 | 65 | 59 | 48 |
| Sensory evaluation of unflavoured layer low viscous (descriptor fruitiness) in % | 100 | n.a. | 81.2 | 75 | 100 | 70 | 70 | 100 | 81.5 | 90 | 80 |

*RF = Regular Flavour;
n.a.: not analyzed

TABLE 4

Intensity rating and recovery values of delivery systems in unflavoured and flavoured layer after storage

|  | Intensity rating in unflavoured layer | Recovery values in unflavoured layer | Intensity rating in flavoured layer | Recovery values in flavoured layer |
| --- | --- | --- | --- | --- |
| Regular Flavour | 5 | 100 | 5 | 100 |
| E 12 | 4.2 | 43 | 8.8 | 344 |
| E 13 | 4.8 | 53 | 8.6 | 326 |
| E 14 | 4.3 | 73 | 8.7 | 193 |
| E 16 | 4.05 | 59 | 8 | 456 |
| E 17 | 3.8 | 68 | 8 | 368 |
| Unflavoured control | 3.8 | n.a. | 3.8 | n.a. | n.a.: not analyzed

It can be concluded that in all delivery systems according to the present invention the intensity ratings in the unflavoured layer after storage are lower than in the regular flavour. At the same time the intensity ratings in the flavoured layer are higher than in the regular flavour.

These findings are also well-supported by the calculation of the GC/MS detected recovery values: In all delivery systems according to the present invention the recovery values in the unflavoured layer are lower whereas the recovery values in the flavoured layer are significantly higher.

The strawberry fruit preparation is further processed (heat treatment 90° C., 9 min). The recovery values in % in the flavoured layer of Regular Flavour and Flavour Delivery System are taken from GC/MS analysis one day after fruit preparation production and shown in the following figure.

FIG. 1 shows recovery values of flavoured layer (fruit preparation) regular flavour and invented delivery flavour system. It can be seen that after the flavour compound is loaded into the flavour delivery system of the present invention and applied in a strawberry fruit preparation, there is a higher recovery value in the flavoured layer achieved after the heating step.

This figure surprisingly shows that the delivery system is not only able to immobilize the flavour during product shelf life in a bilayer product system but also to protect it to a great extent against heat damaging processes.

Example 2

In order to verify that the food additives delivery system according to the present invention compared with a regular flavor sample can suppress the migration of the flavor directly injected into a fruit piece or a whole fruit and simultaneously enhance the flavor intensity in the fruit after shelf life, the produced aroma delivery systems according to the present invention and regular flavor sample are added respectively fresh fruit.

In order to evaluate the flavour retention of the delivery systems of the present invention a direct injected fruit formulation is produced as following:
Preparation of the delivery system as in example E 13
Preparation of a slurry with recipes according to Table 5:

TABLE 5

| | Recipes | |
| --- | --- | --- |
| Composition | Slurry 1 | Slurry 2 |
| Water | 37.46 | 37.26 |
| Pectin | 0.6 | 0.6 |
| Sucrose | 60 | 60 |

TABLE 5-continued

| | Recipes | |
| --- | --- | --- |
| Composition | Slurry 1 | Slurry 2 |
| Citric Acid | 0.2 | 0.2 |
| Guar Gum | 0.14 | 0.14 |
| Potassium sorbate 20% | 1.6 | 1.8 |
| Calcium lactate | 0 | 0.2 |

Preparation of Slurry for Fruit Pieces
Pectin is blended with the sucrose and added under high frequent stirring to a hot aqueous phase (90° C.) and pre-gelatinized. Then Citric Acid and Guar Gum is added. Then Potassium Sorbate and Calcium Lactate are added. The slurries are subjected to Turrax treatment until a homogenous viscous liquid is formed.
Preparation of Fruit Pieces
Injection of 1% of the delivery system as in example E 13 into each fruit with an injection needle.
Preparation of Fruit Pieces in Slurry
Applying 1:1 slurry:fruit
Pasteurizing slurry & fruit for 10 min at 86° C.
Resting slurry & fruit for 14 days at 05° C.
Preparation of Yoghurt Application of Fruit Pieces in Slurry
Applying 20% of slurry & fruit on 80% plain yoghurt 3.5%
Resting yoghurt application for minimum 14 days at refrigerated temperatures The intensity ratings (IR) and recovery values (RV) are shown in following Table 6:

TABLE 6

| Intensity Ratings and recovery values | | | | |
| --- | --- | --- | --- | --- |
|  | IR in fruit | IR in yoghurt | RV in fruit | RV in yoghurt |
| Regular Flavour | 5 | 5 | 100 | 100 |
| Delivery System injected in fruit with Slurry 1 | 5.7 | 6.2 | 114 | 124 |
| Delivery System injected in fruit with Slurry 2 | 8.1 | 3.3 | 162 | 66 |

Figure 1:
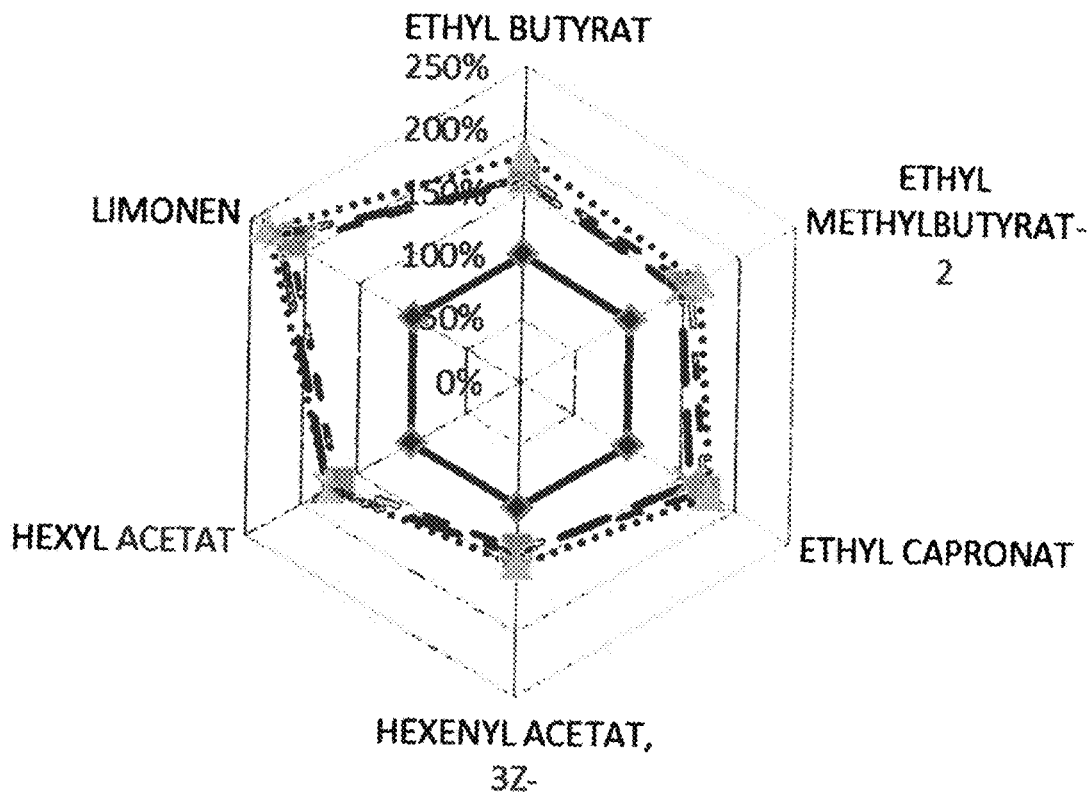
FIG. 1 Recovery values
FIG. 2 Flavour molecules present in fruit after injection and 2 weeks storage at 5° C.
Figure 2:
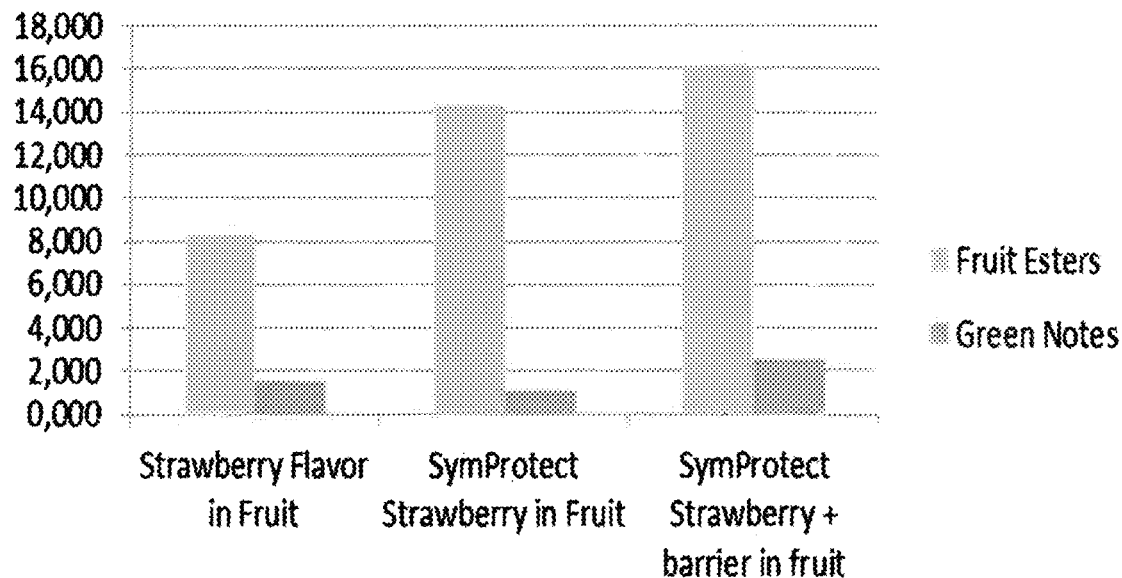
Figure 3:
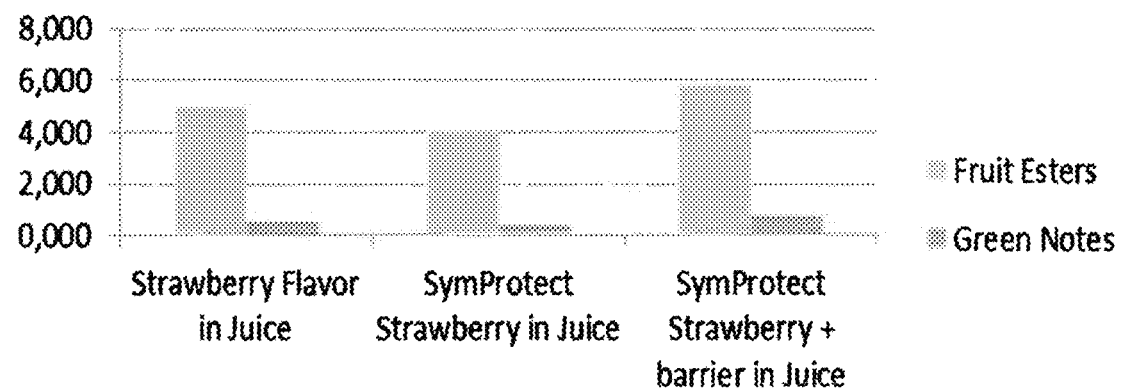
FIG. 3 Flavour molecules present in juice after injection and 2 weeks storage at 5° C.
Figure 4:
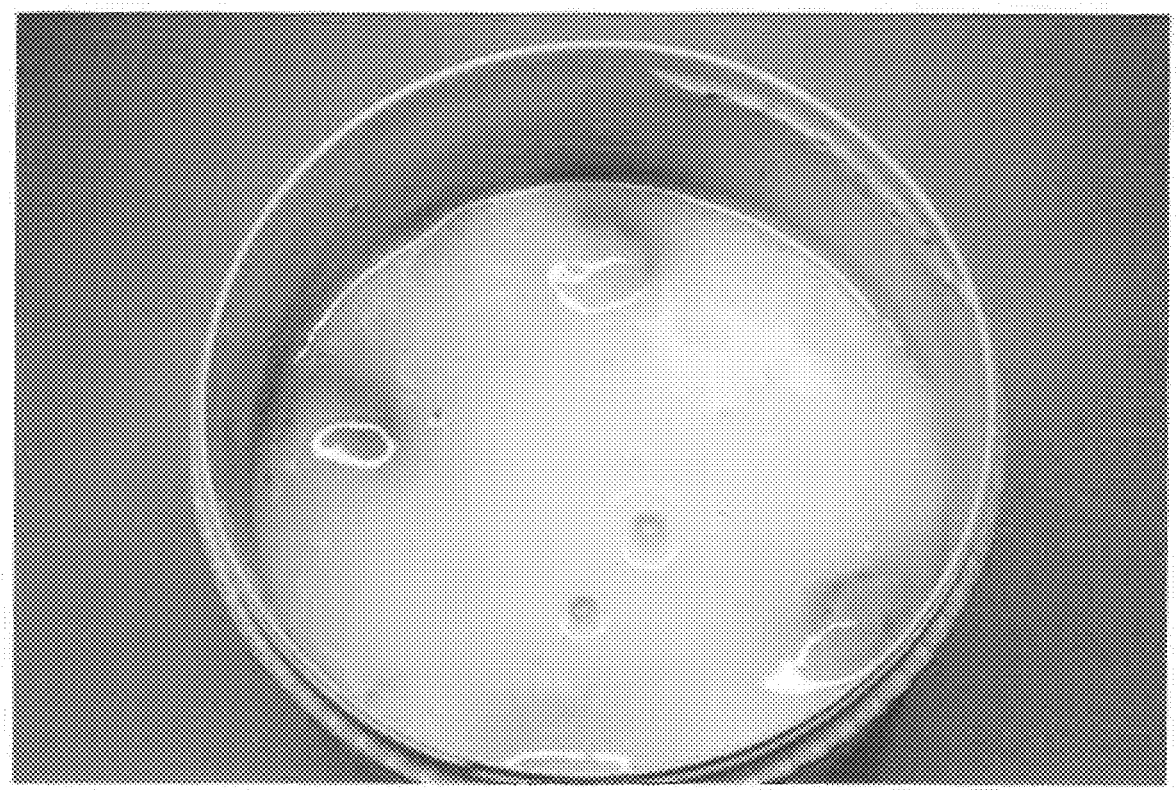
FIG. 4 Composition
Figure 5:
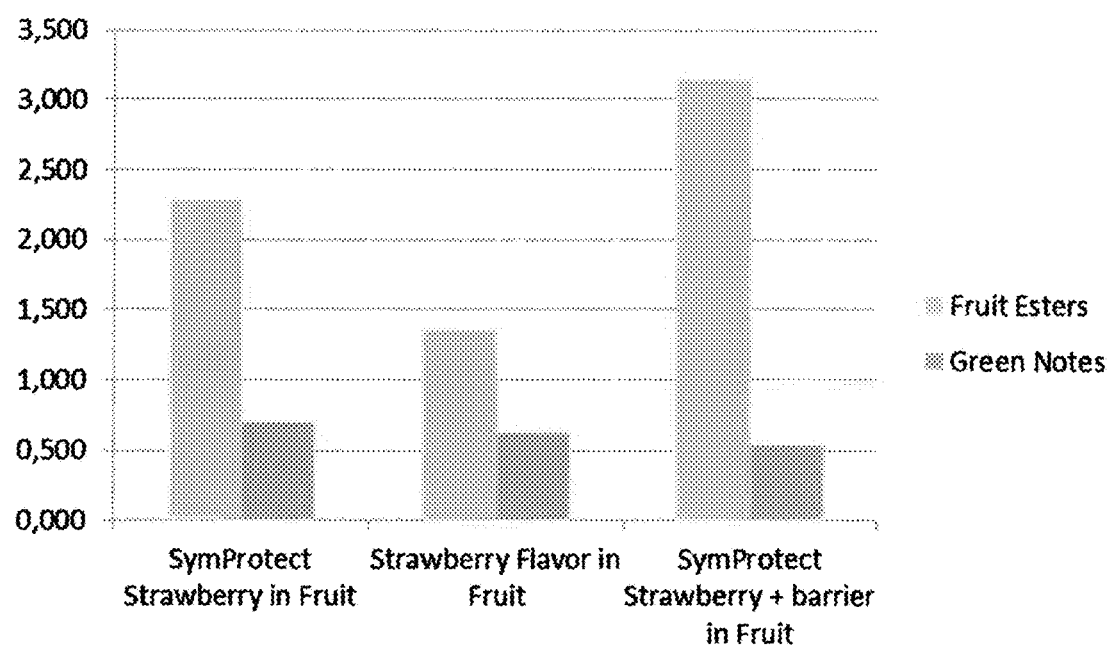
FIG. 5 Flavour molecules present in fruit after injection and 2 weeks storage at 5° C.
Figure 6:
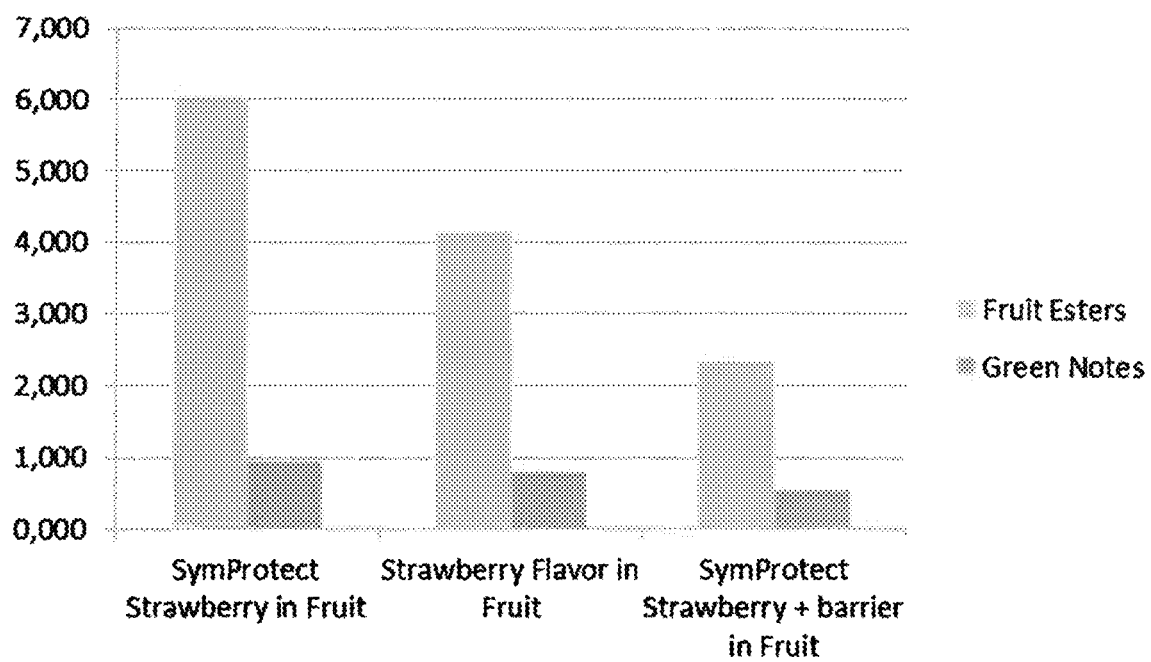
FIG. 6 Flavour molecules present in juice after injection and 2 weeks storage at 5° C.

What claimed is:

1. A delivery system for food additives, consisting of the following components:
   (a) at least one flavour compound with a boiling point above 120° C. and a log P (o/w) value of above 1 which is selected from the group consisting of soluble sweet fruit flavours and oil soluble brown sweet flavours and which is dissolved in a triglyceride which component (a) possesses a droplet size distribution wherein 90% of the droplets have a diameter of about 0.2 μm to about 10 μm and
   (b) at least one emulsifier and/or at least one hydrocolloid dissolved in water,
   wherein the delivery system is an oil-in-water emulsion.

2. The system of claim 1 wherein the ratio between the component (a) and the component (b) is from about 1:4 to about 1:12.

3. The system of claim 1 wherein the flavour compound is dissolved in the triglyceride in a concentration of about 10 wt.-% to about 99 wt.-%.

4. The system of claim 1, wherein the triglyceride is a medium chain triglyceride oil.

5. The system of claim 1, wherein the triglyceride is a medium chain triglyceride.

6. The system of claim 5, wherein the soluble sweet fruit flavours and oil soluble brown sweet flavours are selected from the group consisting of blueberry, strawberry, cherry and nut flavours.

7. A process for preparing a delivery system for food additives as defined in claim 1, comprising the following steps:
   (i) dissolving at least one flavour compound with a boiling point above 120° C. and a log P (o/w) value of above 1, which is selected from the group consisting of soluble sweet fruit flavours and oil soluble brown sweet flavours in a triglyceride to obtain an oil phase,
   (ii) dissolving at least one emulsifier and/or at least one hydrocolloid in water to obtain an aqueous phase,
   (iii) dispersing the oil phase of step (i) into the aqueous phase of step (ii) to obtain an oil-in-water emulsion wherein the oil phase dispersed in the water phase possesses a droplet size distribution wherein 90% of the droplets have a diameter of about 0.2 μm to about 10 μm.

8. The process of claim 7, wherein the ratio between the oil phase and the aqueous phase is from about 1:4 to about 1:12.

9. A multilayer food product, comprising:
   (1) at least one upper food layer, and
   (2) at least one lower food layer,
   wherein at least one of the food layers comprises the delivery system for food additives as defined in claim 1.

10. The food product of claim 9 representing a bilayer product which comprises a milk-based layer and a fruit-based layer.

11. The food product of claim 9, wherein the milk-based layer is selected from the group consisting of a yogurt, quark, curd product layer, and a pudding layer.

12. The food product of claim 9, wherein the delivery system is added into the fruit-based layer.

13. A process for producing a multilayer food product, comprising the following steps:
   (i) providing the delivery system for food additives of claim 1 and
   (ii) adding said delivery system into at least one layer of a multilayer food product.

* * * * *